(12) United States Patent
Dittmann (10) Patent No.: US 11,798,342 B2
(45) Date of Patent: Oct. 24, 2023

(54) MANAGING PHYSICAL OBJECTS USING CRYPTO-ANCHORS

(71) Applicant: International Business Machines Corporation, Armonk, NY (US)

(72) Inventor: Gero Dittmann, Zürich (CH)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 16/693,714

(22) Filed: Nov. 25, 2019

(65) Prior Publication Data

US 2021/0158039 A1   May 27, 2021

(51) Int. Cl.
| | | |
|---|---|---|
| G07D 7/2033 | (2016.01) | |
| H04L 9/32 | (2006.01) | |
| G06F 21/60 | (2013.01) | |
| G06F 21/78 | (2013.01) | |
| G06V 20/80 | (2022.01) | |
| G06Q 30/018 | (2023.01) | |
| G06V 10/22 | (2022.01) | |

(52) U.S. Cl.
CPC ......... *G07D 7/2033* (2013.01); *G06F 21/602* (2013.01); *G06F 21/606* (2013.01); *G06F 21/78* (2013.01); *G06Q 30/0185* (2013.01); *G06V 10/225* (2022.01); *G06V 20/80* (2022.01); *H04L 9/3239* (2013.01); *H04L 9/3247* (2013.01); *G06Q 2220/00* (2013.01)

(58) Field of Classification Search
CPC ...................................................... G06V 20/80
USPC ........................................................ 705/318
See application file for complete search history.

(56) References Cited

U.S. PATENT DOCUMENTS

| | | | |
|---|---|---|---|
| 6,226,619 B1 | 5/2001 | Halperin | |
| 6,310,966 B1 * | 10/2001 | Dulude ................. | G06Q 20/04 382/116 |
| 9,641,342 B2 | 5/2017 | Sriram | |
| 10,176,481 B2 | 1/2019 | Aljawhari | |

(Continued)

FOREIGN PATENT DOCUMENTS

| | | |
|---|---|---|
| CN | 1728162 A | 2/2006 |
| CN | 105009144 A | 10/2015 |

(Continued)

OTHER PUBLICATIONS

Dittmann, et al., "Managing Relationships Between Persons and Physical Objects Based on Physical Fingerprints of the Physical Objects", U.S. Appl. No. 16/693,663, filed Nov. 25, 2019.

(Continued)

*Primary Examiner* — Rafferty D Kelly
(74) *Attorney, Agent, or Firm* — Edward P. Li (57) ABSTRACT

A computer-implemented method, a computer system, and a computer program product for managing physical objects. A computer system associates a physical object of a set of physical objects with an object identifier. The computer system obtains a digital fingerprint, from a unique physical property of the physical object, wherein the digital fingerprint is impacted by the unique physical property. The computer system obtains a dataset from the object identifier and the digital fingerprint. The computer system cryptographically signs the dataset to obtain a signature. The computer system instructs to store the object identifier and the signature on a data storage device.

25 Claims, 7 Drawing Sheets

(56) References Cited

U.S. PATENT DOCUMENTS

| | | | |
|---|---|---|---|
| 10,867,327 B1 | 12/2020 | Wilbert | |
| 2005/0049979 A1 | 3/2005 | Collins | |
| 2005/0189412 A1* | 9/2005 | Hudnut | A47F 9/046 |
| | | | 235/383 |
| 2006/0085275 A1 | 4/2006 | Stokes | |
| 2007/0017985 A1 | 1/2007 | Lapstun | |
| 2007/0273558 A1 | 11/2007 | Smith | |
| 2008/0165014 A1 | 7/2008 | Sayegh | |
| 2014/0108258 A1 | 4/2014 | Williams | |
| 2014/0136431 A1 | 5/2014 | Dahod | |
| 2015/0134552 A1 | 5/2015 | Engels | |
| 2015/0227947 A1 | 8/2015 | Ching | |
| 2016/0098730 A1 | 4/2016 | Feeney | |
| 2016/0253622 A1 | 9/2016 | Sriram | |
| 2016/0300234 A1 | 10/2016 | Moss-Pultz | |
| 2017/0046806 A1 | 2/2017 | Haldenby | |
| 2017/0235896 A1 | 8/2017 | Debusk | |
| 2017/0262862 A1* | 9/2017 | Aljawhari | G06F 16/242 |
| 2017/0300905 A1 | 10/2017 | Withrow | |
| 2018/0173896 A1 | 6/2018 | Arneson | |
| 2018/0322491 A1 | 11/2018 | Madisetti | |
| 2018/0349968 A1 | 12/2018 | O'Brien | |
| 2019/0065788 A1 | 2/2019 | Vijayasankar | |
| 2021/0020012 A1 | 1/2021 | Shakedd | |

FOREIGN PATENT DOCUMENTS

| | | |
|---|---|---|
| CN | 106096443 A | 11/2016 |
| CN | 107979467 A | 5/2018 |
| CN | 108377187 A | 8/2018 |
| CN | 108471352 A | 8/2018 |
| WO | 2018128539 A1 | 7/2018 |
| WO | 2019040308 A1 | 2/2019 |
| WO | 2019045739 A1 | 3/2019 |

OTHER PUBLICATIONS

Dittmann, et al., "Secure Management of Ownership of Physical Objects", U.S. Appl. No. 16/693,692, filed Nov. 25, 2019.

List of IBM Patent or Patent Applications Treated as Related. Filed Nov. 25, 2019. 2 pages.

International Search Report and Written Opinion, International Application No. PCT/IB2020/060299, International dated Nov. 3, 2020, 6 pages.

* cited by examiner

MANAGING PHYSICAL OBJECTS USING CRYPTO-ANCHORS

BACKGROUND

The invention relates in general to the field of management of physical objects using cryptographic techniques. In particular, it is directed to methods for commissioning physical objects based on digital fingerprints obtained from unique physical properties of the objects.

Assuring the authenticity of products and assets is a fundamental need across industries like electronics, pharmaceuticals, gas and petroleum, automotive, aerospace, defense, and retail, where there is a high risk of causing major harm when fake products go unnoticed. Authenticity is critical for raw materials, food, drugs, diagnostic tests, electronic components, hardware parts and finished goods, such as luxury bags and gold bars. A related need is to track and trace the logical and physical route, condition and chain of custody (or ownership) of goods throughout the supply chain and the lifecycle of the assets.

Distributed ledgers, or blockchains, have gained a lot of attention as a technology that increases trust and visibility along the supply chain for more accurate tracing of goods as well as asserting whether a product is genuine or fake. Trust and controlled visibility are achieved in blockchain systems with cryptography, distributed protocols and privacy-enabling techniques, such as zero-knowledge or threshold-signature schemes. Complex manufacturing lines and supply chains can be securely monitored and documented such that downstream business processes can validate the provenance of an item. Likewise, upstream business processes can determine the recipients of goods, for instance in case of a product recall.

A blockchain or any other digital track-and-trace solution alone, however, is often not sufficient to prove originality or provide an uninterrupted chain of relationships throughout the product lifecycle.

Typically, an object is linked to a digital record by a unique identifier (UID) that represents either the individual object or a class of objects by model, batch, production site, manufacturer or similar. The UID is printed, embossed or attached as a tag to the object or its packaging. Many of these identifiers can be easily copied or transferred to a clone of the object. Hence, an identifier alone cannot uniquely and securely identify, i.e., authenticate an object.

SUMMARY

In one aspect, a computer-implemented method for managing physical objects is provided. The computer-implemented method comprises associating a physical object of a set of physical objects with an object identifier (or ID). The computer-implemented method further comprises obtaining a digital fingerprint (or DFD), from a unique physical property of the physical object, wherein the digital fingerprint is impacted by the unique physical property. The computer-implemented method further comprises obtaining a dataset from the object identifier and the digital fingerprint. The computer-implemented method further comprises cryptographically signing the dataset to obtain a signature. The computer-implemented method further comprises instructing to store the object identifier and the signature on a data storage device.

The present approach allows an external verifier to securely conclude as to the authenticity of an object, by interacting with the storage means (even if the storage means involves or forms part of a distributed system such as a blockchain) and by comparing information obtained from such storage means with information (object IDs and DFPs) directly extracted from the objects themselves. Once signed, the dataset forms a crypto-anchor, tying the object ID with a unique, physical property of the object that is typically hard to clone, forge, and transfer to another object. That is, once paired with the object ID, the DFP ties the object ID to the physical object with a unique physical property thereof. The authenticity of this association is provided by the signature. Thus, the present scheme allows to securely and uniquely identify physical objects.

Preferably, each object of the set comprises a physical anchor having the unique physical property, whereby the DFP obtained is impacted by the unique physical property of the physical anchor of the each object. Physical anchors make it easier to achieve unique physical properties for each objects, in a more controllable way.

In preferred embodiments, the steps of associating the each object, obtaining the DFP, obtaining the dataset, cryptographically signing the dataset, and instructing to store the object ID and the signature are performed as part of commissioning the each object.

In a first class of embodiments, the data storage means comprises a computerized data storage system. Thus, the object ID and the signature may be instructed to be stored on this computerized data storage system, so as for the signature to be associated with the object ID in the data storage system, for each of the objects of the set.

The above steps may typically be performed as part, or in view, of commissioning the objects. They may notably be carried out by a computerized entity that is distinct from the computerized data storage system but in data communication therewith.

As evoked above, the computerized data storage system can advantageously be a distributed system supporting a database configured as a shared ledger, as in preferred embodiments. Combining crypto-anchors with a shared ledger ensures that neither the physical identity of an object nor the associated transactions recorded in the ledger can be forged, extending trust from the ledger all the way to physical objects.

Preferably, the method further comprises instructing, for the each object, to store a digital certificate on the computerized data storage system along with the signature and the object ID, so as for both the digital certificate and the signature to be associated with the object ID in the storage system. The digital certificate is designed so as to allow the signature to be verified therewith.

In preferred embodiments, the method further comprises, at a verifier, obtaining, from a given object of the set of object, an object ID and a DFP. The DFP is obtained from the unique physical property of the given object, whereby the DFP obtained is here again impacted by the unique physical property. Next, based on the object ID obtained, a signature and a digital certificate corresponding to the given object can be retrieved by the verifier from the computerized data storage system. Finally, the verifier may ascertain a compatibility between the signature retrieved and the object ID and the DFP obtained from the given object, thanks to the digital certificate retrieved.

Preferably, the commissioning of the each object is carried out in such a manner as to prevent DFPs obtained from the physical objects from being stored in plain form on the computerized data storage system.

In embodiments, commissioning the each object further comprises, for the each object, generating a unique cryptographic key, encrypting the DFP using the generated key, and instructing to store the encrypted DFP on the computerized data storage system along with the signature and the object ID, so as for both the encrypted DFP and the signature to be associated with the object ID in the computerized data storage system.

Preferably, commissioning the each object further comprises, for the each object, forwarding the corresponding object ID and the corresponding, unique cryptographic key to a first owner of the each object.

In preferred embodiments, the method further comprises, at a verifier, obtaining, from a given object of the set of objects, an object ID and a DFP, the DFP obtained from the unique physical property of the given object, whereby the DFP obtained is impacted by the unique physical property. Then, based on the object ID obtained, a unique object key corresponding to the given object is retrieved from the first owner, while an encrypted DFP corresponding to the given object is retrieved by the verifier from the computerized data storage system. Finally, the DFP retrieved from the computerized data storage system is decrypted by the verifier thanks to the unique object key retrieved from the owner, such that the decrypted DFP can be verified to match the DFP obtained from the given object.

Preferably, the method further comprises, at the verifier, retrieving a signature corresponding to the given object from the computerized data storage system, based on the object ID obtained, and verifying that the signature retrieved is compatible with the object ID and the DFP obtained from the given object.

In embodiments, the method further comprises, at a second owner, requesting from the first owner the unique object key corresponding to the given object (i.e., the second owner requests the first owner to provide this unique key), and receiving the key requested from the first owner, e.g., in order to conclude a transaction involving the given object.

In a second class of embodiments, the data storage means includes one or more machine-readable, data storage media affixed to the each object. Thus, at the step of instructing, the object ID and the signature can be instructed to be encoded in the one or more data storage media.

For example, in preferred embodiments, a verifier reads, for a given object of the set of objects, the one or more data storage media to obtain the object ID and the signature encoded therein, and obtains a DFP from the unique physical property of the given object. The DFP obtained is again impacted by the unique physical property. This way, the verifiers can still verify that the signature obtained matches the object ID obtained and the DFP obtained for the given object, e.g., thanks to a public key corresponding to the signature. The verifier shall preferably ascertain the public key obtained thanks to a digital certificate issued for this public key.

In embodiments, the dataset obtained comprises a subset of the DFP; it may in fact comprises a subset of each of the object ID and the DFP. The dataset obtained may notably comprise permuted subsets of the object ID and the DFP.

In another aspect, a computer system for managing physical objects is provided. The computer system comprises one or more processors, one or more computer readable tangible storage devices, and program instructions stored on at least one of the one or more computer readable tangible storage devices for execution by at least one of the one or more processors. The program instructions are executable to: associate a physical object of a set of physical objects with an object identifier (or ID); obtain a digital fingerprint (or DFP), from a unique physical property of the physical object, wherein the digital fingerprint is impacted by the unique physical property; obtain a dataset from the object identifier and the digital fingerprint; cryptographically sign the dataset to obtain a signature; and instruct to store the object identifier and the signature on a data storage device.

Preferably, the system further comprises a computerized data storage system as part of said data storage means, whereby the processing means is configured to execute said instructions, so as to cause, for each object of a set of physical objects, to instruct to store said object ID and the signature on the computerized data storage system. The computerized entity is preferably distinct from the computerized data storage system but in data communication therewith.

In yet another aspect, a computer program product for managing physical objects is provided. The computer program product comprising one or more computer-readable tangible storage devices and program instructions stored on at least one of the one or more computer-readable tangible storage devices. The program instructions are executable to associate a physical object of a set of physical objects with an object identifier. The program instructions are further executable to obtain a digital fingerprint, from a unique physical property of the physical object, wherein the digital fingerprint is impacted by the unique physical property. The program instructions are further executable to obtain a dataset from the object identifier and the digital fingerprint. The program instructions are further executable to cryptographically sign the dataset to obtain a signature. The program instructions are further executable to instruct to store the object identifier and the signature on a data storage device.

Computerized systems, methods, and computer program products embodying the present invention will now be described, by way of non-limiting examples, and in reference to the accompanying drawings.

BRIEF DESCRIPTION OF THE SEVERAL VIEWS OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present invention.

The accompanying drawings show simplified representations of devices or parts thereof, as involved in embodiments. Similar or functionally similar elements in the figures have been allocated the same numeral references, unless otherwise indicated.

FIG. 3 shows how a verifier can be involved to verify whether a given object is genuine. FIG. 4 additionally involves successive owners of a same object, where a unique object key corresponding to the given object is passed from first owner to a second owner as part of an ownership transfer of the object.

In FIG. 5, signatures obtained by cryptographically signing object identifiers and corresponding digital fingerprints are encoded in a 2D barcode.

DETAILED DESCRIPTION

As noted in the background section, a classic digital track-and-trace solution is normally not sufficient to prove originality. Only when trust from the digital domain is extended to the physical domain, product originality can be determined and the movement of goods can be accurately traced. For applications related to proof of authenticity and track and trace, a tight link between physical objects and their digital representation is essential. That is, the physical object must be tied to its associated digital record. Based on these observations, the present inventors came up with simple solutions to trust-anchor an object identifier with the physical product.

In reference to FIG. 1 to FIG. 6, an aspect of the invention is described, which concerns a method for managing physical objects 20 and 20a. This method and its variants are collectively referred to as the "present methods".

Such methods include a series of steps performed for each object of a set of physical objects 20 and 20a, preferably in view of or for the purpose of commissioning the objects 20. Such steps are now described in reference to a particular object of the set.

Figure 3:
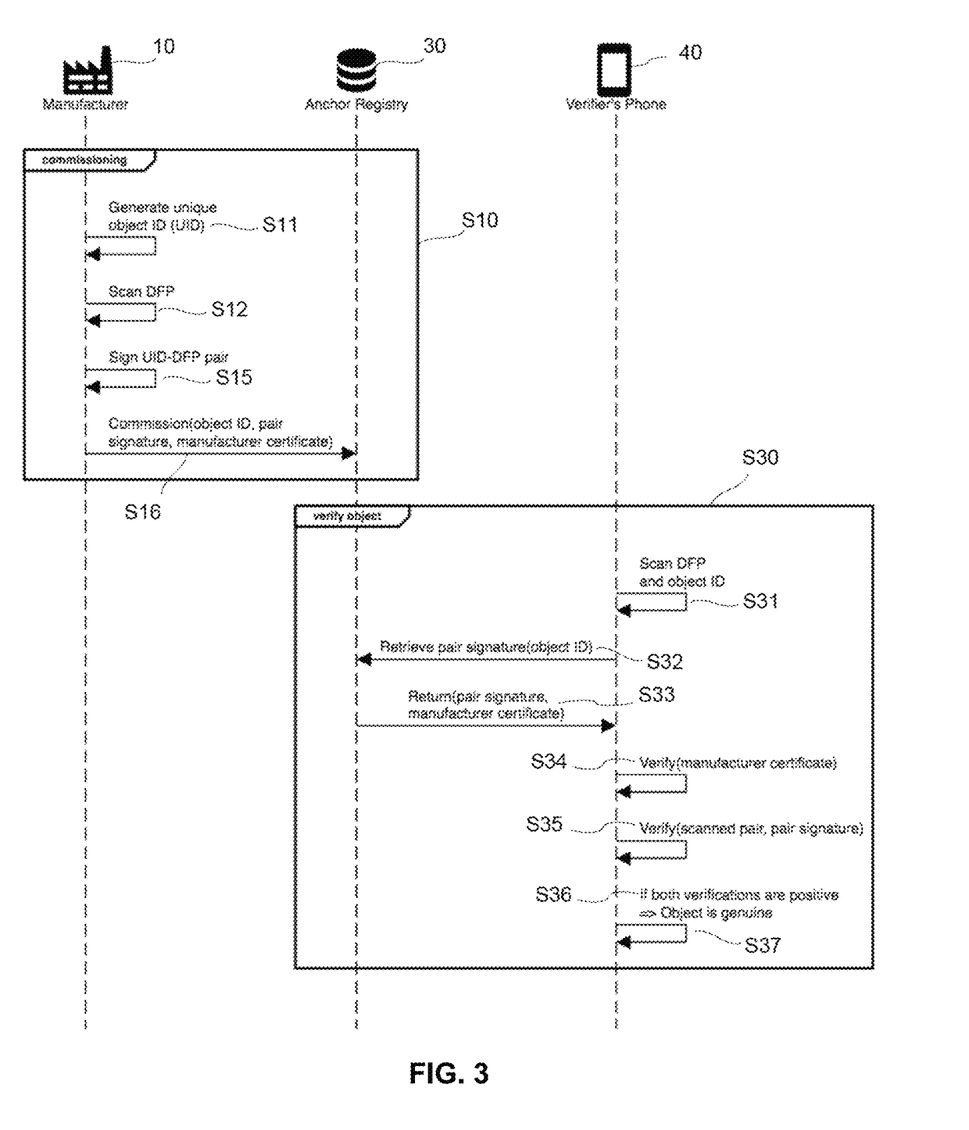
FIG. 3 and FIG. 4 are flowcharts illustrating high-level steps of methods for managing physical objects, according to embodiments, in accordance with one embodiment of the present invention.
Figure 4:
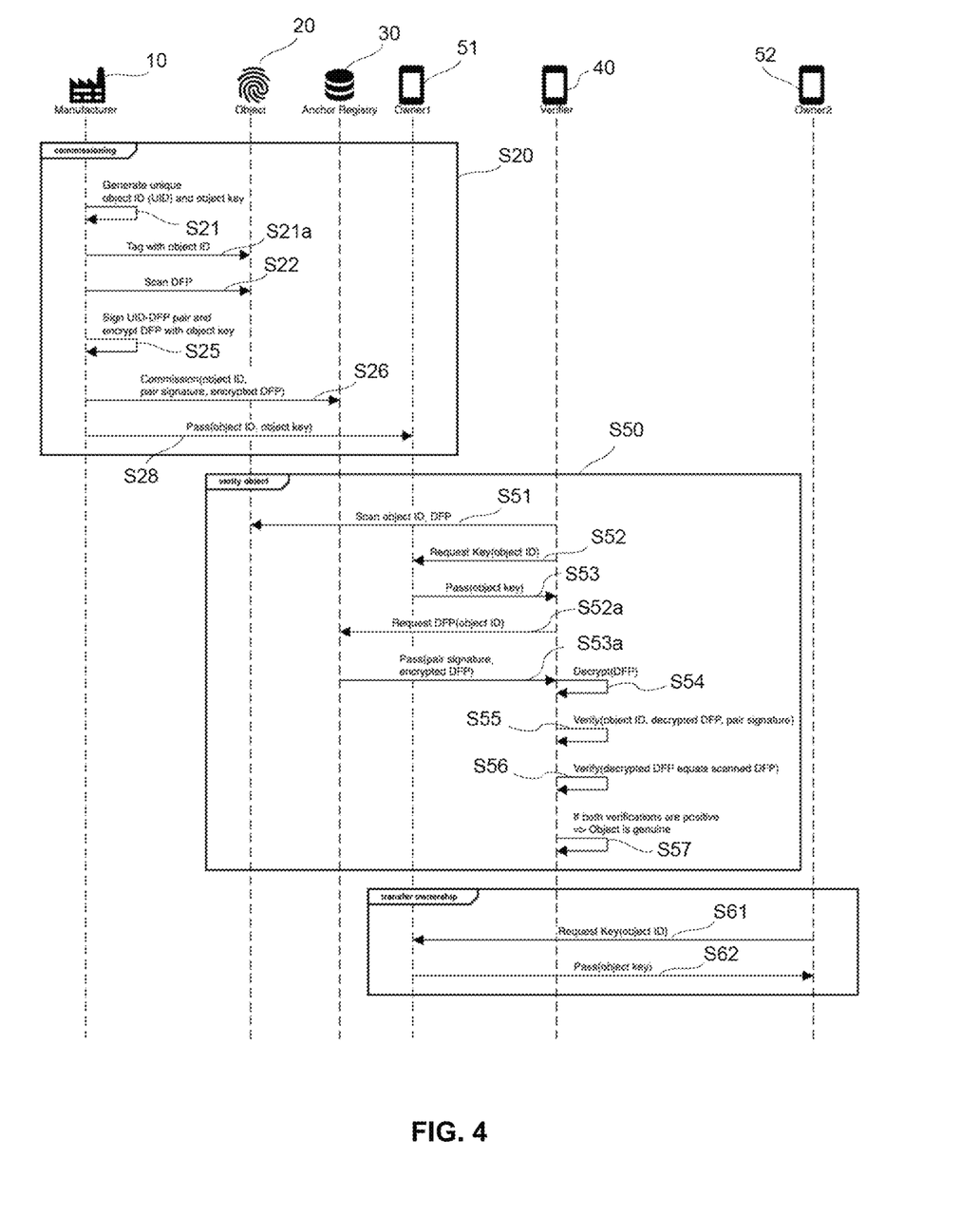
Figure 6:
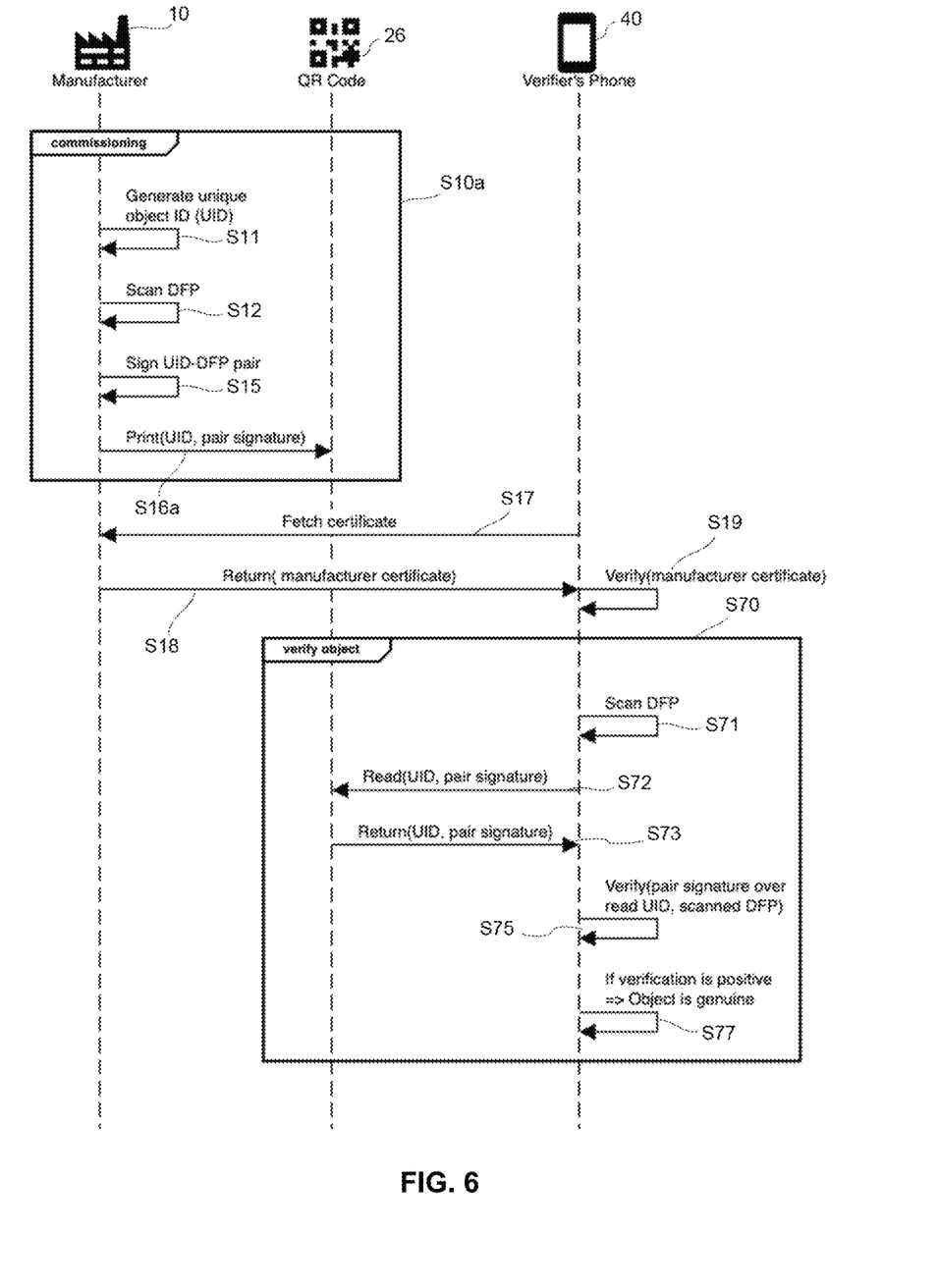
FIG. 6 is a flowchart illustrating how a verifier can verify whether a given object is genuine, by comparing information read from a 2D barcode as shown in FIG. 5 with information retrieved by scanning a digital fingerprint of the object, in accordance with one embodiment of the present invention.

First, each object in the set of physical objects 20 and 20a is associated with an object identifier, or object ID for short, see the steps S11, S21, and S21a in the flowcharts of FIG. 3, FIG. 4, and FIG. 6. This object ID will typically be a unique object ID (UID), allowing the object to be unambiguously identified, at least amongst other (typically similar or identical) objects of the set. UIDs are assumed in the following. In practice, such UIDs are properly stored, together with related attributes that will subsequently allow the manufacturer or any other actor to identify such objects, as well as, e.g., a verifier 40 to check the authenticity (i.e., the genuineness) of any of such objects.

Then, a digital fingerprint (DFP) is obtained (at step S12 and S22) from a unique physical property (or a unique set of properties) of this object. This way, the DFP obtained is impacted by the unique physical property of the corresponding object. The digital fingerprint is typically a number, a string, or any combination of characters (possibly including digits and other characters), or, more generally, a dataset that reflects the unique property (or a unique set of properties). Such a physical property should be understood in a broad sense, as it may include a mechanical, optical, electrical, or even a chemical or biological property of this object, or combinations thereof. It may for example stem from a physical fingerprint (such as a surface structure) or embedded security features (as in banknotes). This property may notably be provided by a physical anchor, added on purpose to the object, as discussed later.

Next, a dataset is obtained from the object ID and the DFP. Again, this dataset may be a number, a string, or any combination of characters, or, more generally, a dataset capturing both the object ID and the corresponding DFP, or parts thereof. The dataset may only comprise a subset of one or each of the object ID and the corresponding DFP. That is, the dataset obtained from the UID and the DFP (also referred to as UID-DFP pair herein) may be a collection or an aggregation of data relating, on the one hand, to the UID and, on the other hand, to the DFP. It may for example be a mere concatenation of respective vectors (e.g., a number concatenating the UID and the DFP) or a permutation of subsets thereof (e.g., a number concatenating subsets of the UID and the DFP). Thus, this dataset may be designed so as not to reveal the DFP per se. In all cases, this dataset can be manipulated as a unit, in particular to obtain the subsequent signature.

Indeed, the dataset obtained is subsequently signed (at step S15 and step S25), cryptographically, to obtain a signature. Cryptographic signature operations are known per se.

And finally, the present methods instruct (at step S16 and step S26) to store the object ID and the corresponding signature on (e.g., to export the signature to) a data storage means 22, 26, and 30. The data storage means may simply consist of machine-readable media 22 and 26 such as radio-frequency identification (RFID)tags, or media depicting machine-readable representations of data, such as 1D or 2D barcodes 22 and 26, e.g., matrix barcodes 26. In variants, the data storage means form part of a digital data storage system 30, such as a database system, which may even be a distributed system (e.g., configured as a blockchain), as discussed below.

The above method will normally be performed by a trusted entity, typically the manufacturer 10 or an initial legal owner of the objects, or under control of this owner or the manufacturer, and preferably at the manufacturer's site. In variants, the method may at least partly be performed by another entity, such as a forensic laboratory analyzing objects to verify that they are genuine.

The present scheme allows an external verifier 40 to securely conclude as to the authenticity of an object, by interacting with the storage means (even if the storage means involves or forms part of a distributed system such as a blockchain), and, if necessary, by interacting with an owner of an object. To that aim, the verifier may be provided with certificates provided from the manufacturer 10 or a certificate authority, using any suitable public key infrastructure (PKI), as in embodiments discussed below. This scheme may further be implemented as part of a track and trace solution.

To prevent an attacker from hijacking a UID, the UID-DFP pairs should much preferably not be widely accessible; the UID-DFP pairs would thus not leave the back-end system 10 in the clear. In variants, however, the signed pairs can be securely stored on the data storage means, together with certificates from the manufacturer 10, if necessary. The DFP may possibly be encrypted and stored on the storage means as well, in addition to the pair signature, as in embodiments discussed later.

Once signed, the dataset forms a crypto-anchor, tying the UID with a unique, physical property of the object that is typically hard to clone, forge, and transfer to another object.

That is, once paired with the UID, the DFP ties the UID to the physical object with a unique physical property thereof. The authenticity of this association is provided by the signature. Thus, the present scheme securely and uniquely identifies an object, allowing the DFP of the object to be extracted from the object, or its packaging (which is itself an object). The DFP can for instance be extracted using a scanner, a smartphone (executing, e.g., a dedicated application), or any suitable detector (e.g., an optical detector or a RFID reader). In order to use the DFP for object identification, the DFP must be associated with the UID of the object, e.g., by a server back-end. As said, different sources of authenticity might be used, e.g., physical fingerprints such as surface structures, or embedded security features as in banknotes. All this is now described in detail, in reference to preferred embodiments.

Figure 2:
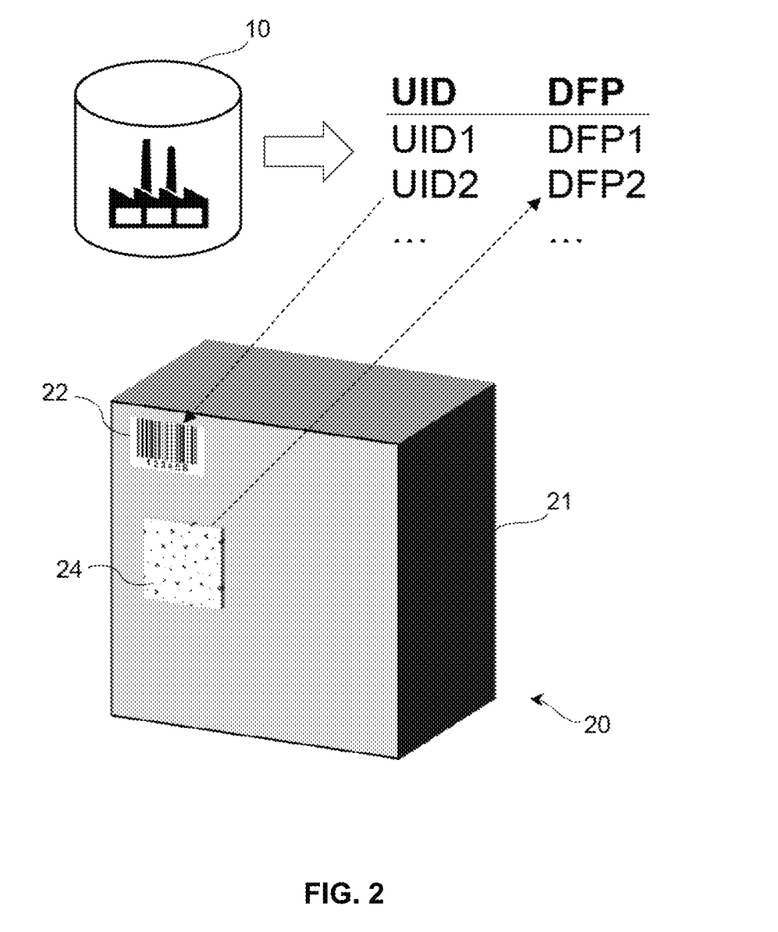
FIG. 2 schematically illustrates how a manufacturer may associate unique identifiers of physical objects with digital fingerprints obtained from unique physical properties of physical anchors affixed to the objects, in accordance with one embodiment of the present invention.
Figure 5:
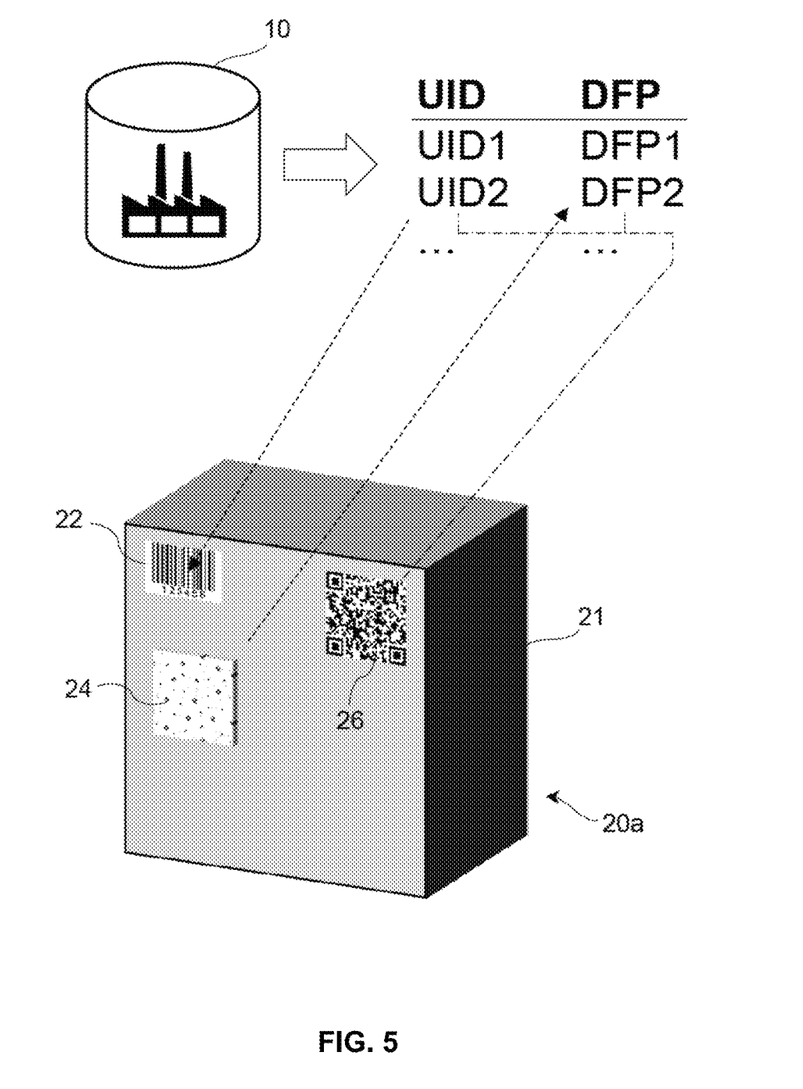
FIG. 5 schematically illustrates how a manufacturer may associate unique identifiers of physical objects with digital fingerprints, in accordance with one embodiment of the present invention.

To start with, referring to FIG. 2 and FIG. 5, each object 20 and 20a of the set preferably comprises a physical anchor 24, which is designed so as to exhibit the unique physical property. Thus, the DFP obtained is impacted by the unique physical property of the physical anchor 24 of the object 20 and 20a.

A physical anchor 24 may for example be unalterably affixed to (entangled with) the object, e.g., with a strong adhesive or in a way that irrevocably alter the exploited property, the object 20 and 20a itself, or a main functionality thereof, when removed, destroyed, or otherwise altered. The anchor 40 may also be integrated, in an inalterable way, in a body of the object. Anchors may for example include embedded security features (e.g., microprinting, security ink, or hologram), and/or physical fingerprints (e.g., a physical unclonable function).

Note, the physical anchor can be affixed to a product or an item, or its packaging (which itself is or comprises an object). The trust-anchor is established for the object bearing the physical anchor. Thus, protection is achieved for the actual object whose unique physical property is exploited. Accordingly, the physical property is preferably extracted from a physical anchor that is tied to the product or item to be sold, rather than its packaging.

In variants to physical anchors, which are objects provided on purpose, one or more physical properties of the object itself may be exploited, such as a surface state, a precise weight, etc., without it being needed to explicitly attach a physical anchor to the object. Physical anchors, however, will normally make it easier to achieve unique physical properties, in a more systematic and controllable way. Still, inherent physical anchors (which can normally not be controlled) would inherently provide a larger degree of entropy, which make them more difficult to clone. In contrast, physical anchors provided on purpose are, in principle, easier to attack precisely because they are more controllable and systematic. Thus, the uniqueness of explicit physical anchors must be generated with some effort.

As evoked earlier, the above steps (i.e., associating the each object, obtaining the DFP, obtaining the dataset, cryptographically signing the dataset, and instructing to store the object ID and the signature) are preferably performed as part of commissioning (in processes S10 and S20) the objects, as assumed in the following. In the present context, commissioning objects means readying the objects for their lifecycle management. The commissioning process can also be regarded as a preparatory process to bring the objects into working condition or market such objects. Typically, batches of numerous, similar objects need be commissioned at the same time by manufacturers. Thus, the commissioning process typically deals with sets of objects. The commissioning process is generally referred to by S10, S10a, and S20 in the flowcharts of FIG. 3, FIG. 4, and FIG. 6.

Figure 1:
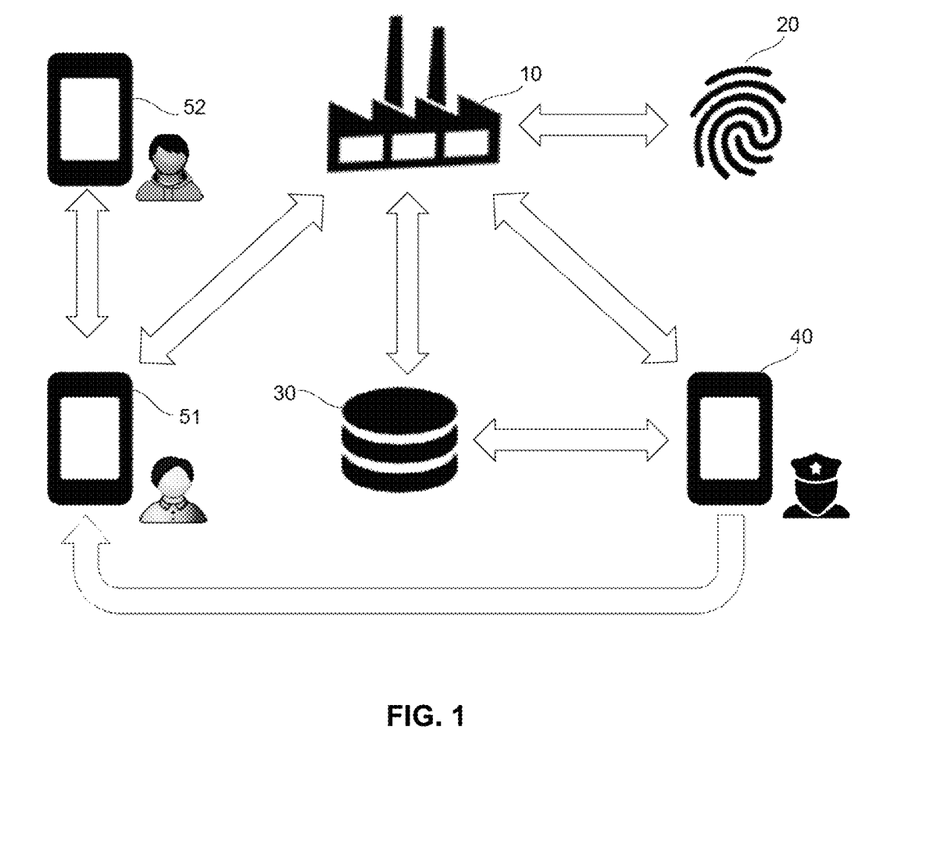
FIG. 1 depicts selected components and actors of a system that can be used to perform steps according to the present methods, in accordance with one embodiment of the present invention.

A first class of embodiments concerns applications where the UIDs and signatures are stored on a computerized data storage system 30, e.g., a computerized database, as assumed in FIG. 1, FIG. 3, and FIG. 4. There, the object IDs and the corresponding signatures are instructed (in steps S16 and S26) to be stored on a computerized storage system 30, so as for each signature to be associated with a corresponding object ID in the data storage system 30 (for each of the objects of the set). For example, the signature may be indexed by the object ID in the data storage system 30.

As illustrated in FIG. 1, the steps performed for commissioning the objects 20 are preferably carried out by a computerized entity 10 (e.g., a trusted back-end system at the manufacturer's site) that is distinct from the computerized data storage system 30 but in data communication therewith. Such a data storage system 30 can thus be referred to as an external data storage system 30.

Exporting the signed UID-DFP pairs does not compromise the security of the objects. Security is not compromised, inasmuch as only the signed UID-DFP pairs need be stored on the system 30; the DFPs do preferably not leave the trusted back-end system 10. UIDs must be handled with care too. However, being less critical objects than the DFPs, they may be made available to selected entities. For example, UIDs may be needed to look up the signature corresponding to a given object. Thus, the computerized data storage system 30 may even be a distributed system supporting a database configured as a shared ledger. The shared ledger may notably be configured as a blockchain, and more preferably as a business blockchain such as the so-called Hyperledger Fabric, or a similar blockchain relying on a consensus algorithm that is less compute-intensive than the so-called Proof-of-Work variant.

A blockchain is an attractive back-end platform in the present context as it is distributed, immutable, can be highly available and can, if suitably set up, be independent of object manufacturers and crypto-anchor vendors. Combining crypto-anchors with a blockchain as discussed above ensures that neither the physical identity of an object nor the associated transactions recorded in the ledger can be forged, extending trust from the ledger all the way to physical objects. Confidentiality is normally difficult to achieve with a blockchain as the contents of a distributed ledger are, in principle, readable by all network participants (peers). However, the various schemes discussed herein make it possible to circumvent this problem, since the present methods only impose to store the signed UID-DFP pairs on the system 30.

In variants, a central database may be used. However, a central database might be subject to attacks and a single point of failure, not least if the manufacturer goes out of business. Thus, UID-DFP pairs can advantageously be stored on a blockchain, where distribution and consensus algorithms improve the robustness against failure and fraud.

As illustrated in FIG. 3, the method preferably comprises instructing (step S16) to store a digital certificate (again for each object 20) on the computerized data storage system 30, along with the signature obtained for the corresponding object, as well as the object ID itself. This way, both the digital certificate and the signature can be associated with the object ID in the storage system 30. Each digital certificate is designed so as to allow the corresponding signature to be verified.

Therefore, in embodiments, a verifier 40 may obtain (at step S31) an object ID and a DFP from a given object 20 of the set of objects. As explained earlier, the DFP can be obtained at the verifier based on the unique physical property of this object. Again, the DFP obtained is impacted by the unique physical property of this object, e.g., as resulting from the attached physical anchor. Next, based on the object ID obtained, the verifier can retrieve (at steps S32-S33) the corresponding signature and digital certificate from the data storage system 30. And finally, the verifier 40 may ascertain (at steps S34 and S35) the compatibility of the signature retrieved (at steps S32-S33) with the object ID and the DFP obtained at step S31, thanks to the digital certificate retrieved (at steps S32-S33) with the signature. All this may for example by carried out thanks to, e.g., a suitably designed application installed on the verifier's smartphone 40, as illustrated in FIG. 1. In variants to smartphones, an optical device may also be used along with dedicated software, e.g., applying computer vision and image processing techniques to glean information digitally by optically scanning the object (or a physical anchor thereof), and one or more barcodes 22 and 26 attached to it, as assumed in the example of FIG. 2 and FIG. 5.

In embodiments, the objects 20 are commissioned (in processes S10 and S20) in such a manner as to prevent DFPs obtained from the physical objects 20 from being stored in plain form on the computerized data storage system 30. That is, care is taken so that unencrypted DFPs stay at the first location 10, e.g., with the manufacturer 10. In this simple variant, DFPs are not stored on the external storage system 30 (which, again, may be a blockchain); only the signatures of the UID-DFP pairs are stored on this storage system 30. As said, the signatures are preferably stored along with certificates, so as to be able to verify (at step S34) the authenticity of the signatures. All such datasets (signatures, certificates) shall typically be indexed by the object IDs in the system 30.

Many features of the present methods as described above can advantageously be combined, for example as described in FIG. 3. That is, during (or in view of) a commissioning process S10, the manufacturer 10 may first generate (at step S11) UIDs from a batch of physical objects 20, which are provided, each, with physical anchors 24. Scanning such physical anchors allows respective, unique DFPs to be obtained at step S12. Then, a dataset derived from the UID-DFP combination can be signed at step S15, prior to storing (at step S16) the UIDs, signatures, and certificates on the external storage 30 (called anchor registry in FIG. 3). Next, in order to verify (at step S30) the authenticity of a given object, a verifier 40 may, using a dedicated application installed on a smartphone, scan (at step S31) the DFP and UID of this object, query (at step S32) the anchor registry 30 based on the scanned UID, for the registry 30 to return (at step S33) the associated signature and certificate. Using the certificate returned, the verifier may first check (at step S34) the authenticity of the manufacturer certificate and then verify (at step S35) whether the scanned DFP and UID are compatible with the signature retrieved (at steps S32-S33) from the registry. Finally, the verifier can conclude (at step S36) as to the genuineness of the object based on outcomes from both tests at steps S34 and S35.

More sophisticated approaches can be contemplated, as now described in reference to FIG. 4. In this example, the commissioning process S20 further comprises generating (at step S21) unique cryptographic keys for each object of the batch, in addition to UIDs. Then, corresponding DFPs can be encrypted (at step S25) using respective object keys as generated at step S21. This way, the encrypted DFPs can safely be stored (at step S26) on an external computerized data storage system 30, along with signatures and UIDs as obtained at steps S25 and S21, respectively. Again, both the encrypted DFPs and signatures are associated with (e.g., indexed by) corresponding UIDs in the storage system 30. As noted earlier, each object 20 is typically tagged (at step S21a) with its respective UID, e.g., encoded as a barcode on each object, to ease subsequent identification and verification steps.

The present methods may notably be used to secure transaction processes between successive owners of the objects 20, as in embodiments described below. In particular, the commissioning process S20 may further comprise forwarding at step S28, for each object 20, the corresponding UID and object key (as generated at step S21) to a first owner 51 of this object 20. This owner may for instance be the first, legal owner of the object, e.g., the (legal) entity who initially instructed to manufacture the object. This may also be a purchaser of the object, if already known, or a current owner.

Passing the object key may notably be useful for the verifier (to verify the genuineness of the object) and for transferring ownership, whereby the object key can be passed from one object owner 51 to the next owner 52, as in embodiments below. As described above, the DFP is preferably encrypted with an object key (different for each object) and, once encrypted, the DFP can be stored on an external storage system 30, even if this system does not provide data privacy (e.g., a blockchain). To read sensitive data on this data storage system 30, an attacker would need to acquire every individual object key, which the large number of objects and their wide distribution make intractable in practice.

In variants (not shown in figures), the UID-DFP pair may first be signed and then encrypted using an object key, prior to exporting the signed and encrypted pair, as well as a certificate corresponding to the key used to sign the pair. For example, the object manufacturer 10 may generate a UID, a cryptographic object key, scan the DFP, signs the UID-DFP pair signed pair, and then encrypt the pair with the object key. Encrypted in this way, the signed pair can be stored on a blockchain without the risk of DFP hijacking. Thus, only the signature is stored on the external storage 30 (as in the first variants above), or the pair with the signature is encrypted and stored on the external storage (second variants above).

As further illustrated in FIG. 4, a verifier 40 may, in embodiments, obtain (at step S51) an UID and a DFP from a given object 20, e.g., by scanning the object 20. Again, the DFP is impacted by the unique physical property of the object (e.g., of its physical anchor). Then, based on the UID obtained, the verifier 40 may proceed to retrieve (at step S52) the unique object key corresponding to this object from the owner 51, e.g., by requesting (at step S52) the key from the first owner 51 based on the UID scanned, for the owner 51 to return (at step S53) the key. Next, the verifier may retrieve (at steps S52a-S53a) the encrypted DFP corresponding to the given object 20, this time by querying the anchor registry 30. And finally, the verifier may decrypt (at step S54) the DFP as retrieved from the registry 30 thanks to the object key retrieved from the owner, in order to verify (at step S56) that the decrypted DFP matches the DFP as directly obtained from the object 20.

As before, and aside from verifying the DFP, the verifier 40 may further retrieve (at steps S52a-S53a) a signature corresponding to that same object 20 (from the anchor registry 30), based on the UID obtained at step S51, in order to verify (at step S55) whether the signature retrieved at steps S52a-S53 is compatible with the UID and the DFP obtained (at step S51) from the given object. Eventually, the verifier will conclude (at step S57) to the genuineness of the object, provided that both tests (steps S55 and S56) are validated.

Next, beside verifications made by an independent verifier 40, ownership transfers can be concluded by transferring an object key associated with a given object. Namely, the second owner 52 of this object may request (at step S61) the unique object key corresponding to that object 20 from the first owner 51. Then, assuming that an appropriate transaction protocol was followed (which is orthogonal to the purposes of the present embodiments and therefore not discussed here in detail), the second owner may receive (at step S62) the key from the first owner 51. This will normally be achieved in a context where the transaction has been approved, which may involve, e.g., a transaction platform, as well as any suitable protocol in view of approving the transaction.

Thus, the scheme proposed in FIG. 4 differs from that of FIG. 3 in that DFPs are exported to the external storage system 30 (in encrypted form) and passed (now in plain) to successive, legitimate owners, in view of ascertaining the genuineness of the objects (by a verifier) and concluding ownership transfers. Both schemes pertain to a first class of embodiments, where UIDs and signatures, as well as other digital objects, are exported to an external data storage system 30.

Interestingly, variants to such schemes can be contemplated, which do not require any external data storage system 30, as in embodiments discussed below in reference to FIG. 5 and FIG. 6. Such embodiments concern a second class of embodiments, which rely on machine-readable, data storage media 22 and 26. That is, object IDs and signatures of UID-DFP pairs are here again stored on a data storage means. However, the data storage means now includes one or more machine-readable, data storage media 22 and 26 affixed to each object 20a, as illustrated in FIG. 5.

Both the UID and the signature may accordingly be instructed (at step S16a) to be encoded in one or more data storage media 22 and 26, see FIG. 6. Here, one may for example use RFID tags attached to the objects, or optically-readable media, such as 1D or 2D (e.g., matrix) barcodes stuck to the object. In the former case, a RFID reader can be used to obtain information stored on the tags, whereas an optical scanner (a barcode reader) is used in the latter case. A smartphone may possibly be used in both cases, assuming it is equipped with the necessary reader.

A verifier 40 may, for a given object 20a, read (at step S72) one or more of the data storage media 22 and 26, in order to obtain (at step S73) the UID and the signature encoded therein. In addition, the verifier 40 may obtain (at step S71) a DFP of this object (again, from the unique physical property of the object). This way, the verifier 40 can verify (at steps S75-S77) that the signature obtained (at step S73) matches the UID obtained (at step S73) and the DFP obtained (at step S71) for the object, thanks to steps S17-S19 a public key corresponding to the signature. Again, any suitable PKI may be relied on.

Several variants can be contemplated. For instance, one may encode the UID and the signature in a same medium or in several media, all affixed to the object of interest, or its packaging. For example, the UID may be encoded in a usual 1D barcode 22 (e.g., on the packaging), while the sole signature may be encoded in a distinct 2D barcode 26 (e.g., on the product itself). In variants, the UID may still be stored on the 1D barcode 22, while the pair signature is encoded in the 2D barcode 26, as assumed in FIG. 5 and FIG. 6. Note, while the pair signature may possibly be encoded together with the UID in the 2D barcode, though this is not necessary if the UID can already be read from the 1D barcode.

This way, the object ID may generally be read with any suitable barcode device, as needed at a distributor or a retailer of the objects, while the 2D barcode may only be correctly interpreted by a properly configured smartphone or optical reader of a verifier 40, in one step. In all cases, the verifier 40 may read and thus access the encoded data and compare them to the DFP detected, e.g., from a physical anchor, thanks to a public key obtained beforehand, e.g., via a digital certificate obtained from a certificate authority or the manufacturer 10. Note, the public key may be delivered together with an application installed at the verifier 40 (e.g., on a smartphone thereof), with the consent of the manufacturer or any other legitimate authority.

As in FIG. 3, the verifier 40 may ascertain (at step S19) the public key obtained (at steps S17-S18) thanks to a digital certificate issued (at step S18) for this public key. Again, several variants can be contemplated. For example, the public key obtained may be ascertained by comparing the signature read with a signature included in the digital certificate or by directly comparing public keys, if the certificate issued includes the key.

Note, aspects of the first class and second class of embodiments described above may be combined. For example, the signatures and UIDs may possibly be encoded in machine-readable media 22 and 26, while being concurrently exported to an external data storage system 30 (if necessary along with other digital objects, such as certificates and encrypted DFPs), in order to allow various kinds of verifications.

Figure 7:
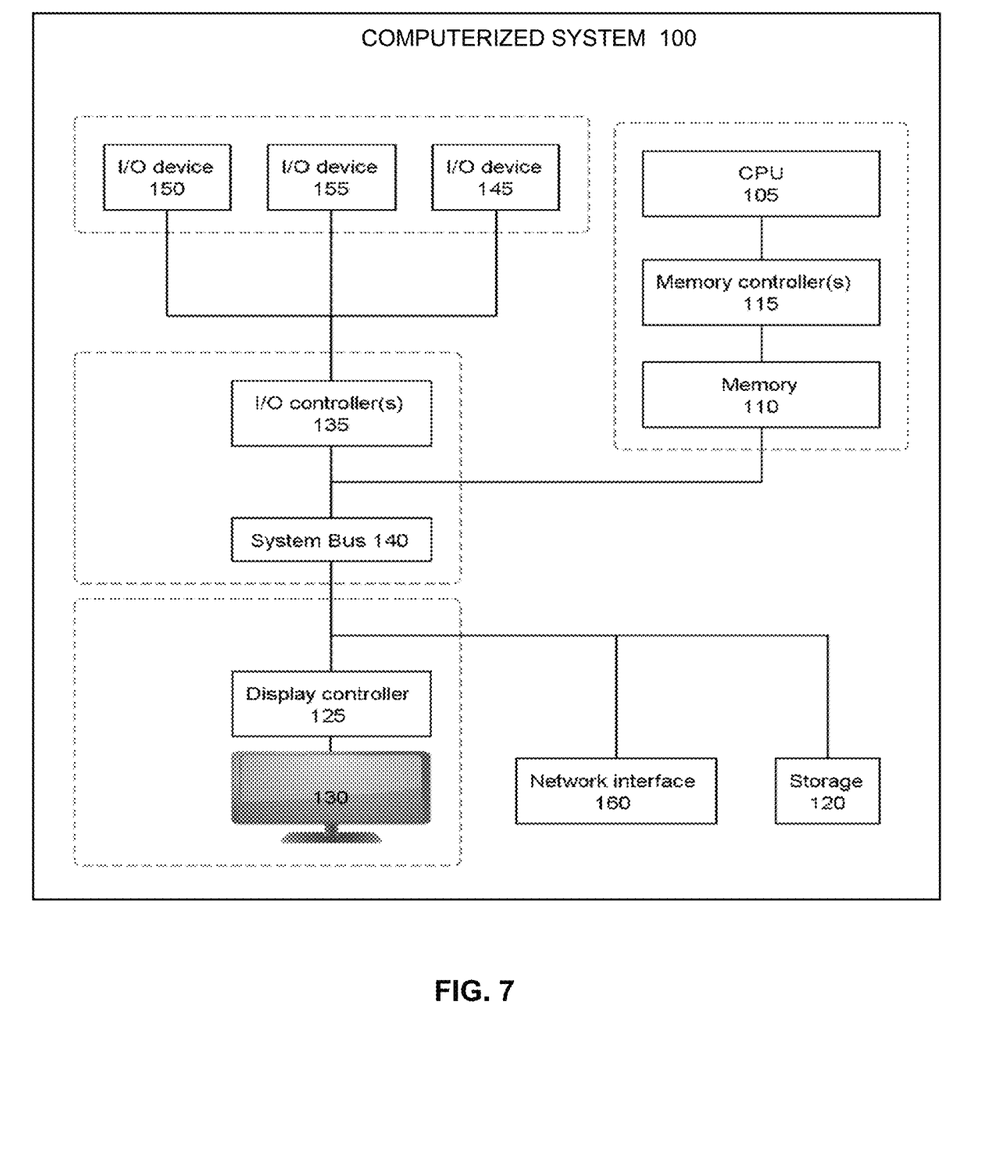
FIG. 7 is schematically representing a computing system for implementing steps for supporting an ownership database, in accordance with one embodiment of the present invention.

According to another aspect, the invention can be embodied as a computerized system for managing physical objects 20 and 20a, as now described in reference to FIG. 7. Functional aspects of such a system have already been described in reference to the present methods. Such a system is thus only succinctly described in the following.

To start with, this computerized system shall typically include one or more computerized systems 100, see FIG. 7, notably at the manufacturer 10 or at an entity that initially performs steps S10 and S20 of the present methods. Similar or comparable computerized systems 100 may further be involved at the verifier 40 and successive owners 51 and 52 of the objects 20 and 20a, as described earlier.

In all cases, such computerized systems 100 notably comprise storage means 110 storing instructions, as well as processing means 105 configured to execute the instructions, in view of performing steps as described earlier in reference to the present methods. For what concerns the initial processes S10 and S20, execution of such instructions will notably cause, for each object 20 and 20a of a set of physical objects 20 and 20a, to:

Associate (at steps S11, S21, and S21a) each object 20 and 20a with an object identifier, e.g., a UID;

Obtain (at steps S12 and S22) a DFP from a unique physical property of the object (e.g., a physical anchor thereof), whereby the DFP obtained is impacted by the unique physical property;

Obtain a dataset from the UID and the DFP, e.g., based on permuted subsets thereof;

Cryptographically sign (at steps S15 and S25) the dataset obtained to obtain a signature; and Instruct (at steps S16 and S26) to store the UID and the signature on a data storage means 22, 26, and 30.

As said, the above data storage means 22, 26, and 30 can for example include one or more machine-readable, data storage media 22 and 26 affixed to the each object. In variants, they include a computerized data storage system 30. Again, the computerized system 100 is preferably distinct from the data storage system 30, although in data communication therewith, as illustrated in FIG. 1. The external storage 30 may for instance be a distributed system supporting a database configured as a shared ledger, as described earlier.

In such embodiments, the computerized system 100 further includes the computerized data storage system 30, as part of the data storage means, in addition to at least one computerized system 100. In such cases, the processing means 105 of the computerized system 100 is further configured to execute instructions, so as to cause, for each object 20 and 20a, to instruct (at step S16 and S26) to store the UID and the corresponding signature on the external data storage system 30.

Similar or comparable computerized systems 100 may be provided at the verifier 40, as well as at the owners 51 and 52, which may simply consist of smartphones, provided with suitable applications allowing to, e.g., scan UIDs and DFP, verify certificates, communicate with a remote entity, etc.

Finally, according to a further aspect, the invention can also be embodied as a computer program product for managing physical objects 20 and 20a. This program product comprises a computer readable storage medium having program instructions embodied therewith. Such program instructions are executable by one or more processors of a computerized system (e.g., including one or more computerized systems 100 such as depicted in FIG. 7) to cause the computerized system to perform steps according to the present methods. The instructions may for instance be executed jointly by processing means of computerized systems 100, as necessary to perform such steps, in operation.

In particular, the instructions may cause to associate (e.g., at a manufacturer) each object of a set of objects with an object ID. Next, a DFP is obtained from a unique physical property of each object (the DFP obtained is thus impacted by the unique physical property). Next, a dataset is then obtained from the object ID and the DFP, for each object. The dataset obtained is furthermore cryptographically signed, in order to obtain a signature. Finally, the object ID and the corresponding signature are instructed to be stored on a data storage means, e.g., a machine-readable medium or a computerized data storage system 30. In the latter case, the program instructions are further executable to cause the computerized system to instruct to store UIDs and corresponding signatures (as well as digital certificates and encrypted versions of the DFPs, if necessary) on the system 30, for each object 20 and 20a.

Computerized devices can be suitably designed for implementing embodiments of the present invention as described herein. For instance, the computerized system 100 depicted in FIG. 7 schematically represents a general-purpose computer. In exemplary embodiments, in terms of hardware architecture, as shown in FIG. 7, the computerized system 100 includes a processor 105, memory 110 coupled to a memory controller 115, and one or more input and/or output (I/O) devices 145, 150, and 155 (or peripherals) that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computerized system 100, a semiconductor-based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 4, the software in the memory 110 includes methods described herein in accordance with exemplary embodiments and a suitable operating system (OS) 111. The OS 111 essentially controls the execution of other computer programs and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS 111. Furthermore, the methods can be written as an object-oriented programming language, which has classes of data and methods, or a procedure programming language, which has routines, subroutines, and/or functions.

Possibly, a conventional keyboard 150 and mouse 155 can be coupled to the input/output controller 135. Other I/O devices 145, 150, and 155 may include other hardware devices.

In addition, the I/O devices 145, 150, and 155 may further include devices that communicate both inputs and outputs. The computerized system 100 can further include a display controller 125 coupled to a display 130. In exemplary embodiments, the computerized system 100 can further include a network interface or transceiver 160 for coupling to a network. The network transmits and receives data between the computerized system 100 and external systems. The network is possibly implemented in a wireless fashion, e.g., using wireless protocols and technologies, such as WiFi, WiMax, etc. The network may be a fixed wireless network, a wireless local area network (LAN), a wireless wide area network (WAN) a personal area network (PAN), a virtual private network (VPN), intranet or other suitable network system and includes equipment for receiving and transmitting signals.

The network can also be an IP-based network for communication between the computerized system 100 and any external server, client and the like via a broadband connection. In exemplary embodiments, network can be a managed IP network administered by a service provider. Besides, the network can be a packet-switched network such as a LAN, WAN, Internet network, etc.

If the computerized system 100 is a PC, workstation, intelligent device or the like, the software in the memory 110 may further include a basic input output system (BIOS). The BIOS is stored in ROM so that the BIOS can be executed when the computerized system 100 is activated.

When the computerized system 100 is in operation, the processor 105 is configured to execute software stored within the memory 110, to communicate data to and from the memory 110, and to generally control operations of the computerized system 100 pursuant to the software. The methods described herein and the OS 111, in whole or in part are read by the processor 105, typically buffered within the processor 105, and then executed. When the methods described herein are implemented in software, the methods can be stored on any computer readable medium, such as storage 120, for use by or in connection with any computer related system or method.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for managing physical objects, the computer-implemented method comprising:
    associating a physical object of a set of physical objects with an object identifier;
    obtaining a digital fingerprint of the physical object, wherein the digital fingerprint is a first dataset that is obtained from at least one of a physical property, a chemical property, and a biological property of the physical object;
    obtaining, from the object identifier and the digital fingerprint, a second dataset that captures information of a pair of the object identifier and the digital fingerprint;
    cryptographically signing the pair of the object identifier and the digital fingerprint; and
    storing the object identifier and signature of the pair of the object identifier and the digital fingerprint on a data storage device.

2. The computer-implemented method of claim 1, wherein the physical object comprises a physical anchor having the unique property, wherein the digital fingerprint is impacted by the unique property of the physical anchor of the physical object.

3. The computer-implemented method of claim 1, wherein the steps of associating the physical object, obtaining the digital fingerprint, obtaining the second dataset, cryptographically signing the second dataset to obtain the signature, and storing the object identifier and the signature are performed as part of commissioning the physical object.

4. The computer-implemented method of claim 3, wherein, at the step of storing, the object identifier and the signature, the object identifier and the signature are stored on a computerized data storage system, so as for the signature to be associated with the object identifier in the computerized data storage system.

5. The computer-implemented method of claim 4, wherein commissioning the physical object is carried out by a computerized system that is distinct from the computerized data storage system but in data communication therewith.

6. The computer-implemented method of claim 4, wherein the computerized data storage system is a distributed system supporting a database configured as a shared ledger.

7. The computer-implemented method of claim 4, further comprising:
    storing, for the physical object, a digital certificate corresponding to the physical object on the computerized data storage system along with the signature and the object identifier, so as for both the digital certificate and the signature to be associated with the object identifier in the computerized data storage system, the digital certificate being designed so as to allow the signature to be verified therewith.

8. The computer-implemented method of claim 7, further comprising steps of a verifier:
    obtaining, from the physical object, the object identifier and the digital fingerprint, the digital fingerprint being obtained from the unique property of the physical object, wherein the digital fingerprint is impacted by the unique property;
    based on the object identifier, retrieving the signature and the digital certificate corresponding to the physical object from the computerized data storage system; and
    ascertaining compatibility between the signature, the object identifier, and the digital fingerprint.

9. The computer-implemented method of claim 7, wherein the commissioning of the physical object is carried out in such a manner as to prevent the digital fingerprint from being stored in a plain form on the computerized data storage system.

10. The computer-implemented method of claim 4, wherein the commissioning the physical object further comprises:
    generating a unique cryptographic key corresponding to the physical object;
    encrypting the digital fingerprint using the unique cryptographic key; and
    storing an encrypted digital fingerprint on the computerized data storage system along with the signature and the object identifier, so as for both the encrypted digital fingerprint and the signature to be associated with the object identifier in the computerized data storage system.

11. The computer-implemented method of claim 10, wherein the commissioning the physical object further comprises:
    forwarding the object identifier and the unique cryptographic key to a first owner of the physical object.

12. The computer-implemented method of claim 11, further comprising steps of a verifier:
    obtaining, from the physical object, the object identifier and the digital fingerprint, the digital fingerprint being obtained from the unique property of the physical object, wherein the digital fingerprint is impacted by the unique property;

based on the object identifier, retrieving from the first owner the unique cryptographic key corresponding to the physical object, and retrieving from the computerized data storage system the encrypted digital fingerprint corresponding to the physical object;

decrypting the encrypted digital fingerprint; and verifying that a decrypted digital fingerprint matches the digital fingerprint.

13. The computer-implemented method of claim 12, further comprising steps of the verifier:

based on the object identifier, retrieving the signature corresponding to the physical object from the computerized data storage system; and verifying that the signature is compatible with the object identifier and the digital fingerprint.

14. The computer-implemented method of claim 12, further comprising steps of a second owner:

requesting from the first owner the unique cryptographic key corresponding to the physical object; and receiving the unique cryptographic key from the first owner.

15. The computer-implemented method of claim 1, wherein the data storage device includes one or more machine-readable data storage media affixed to the physical object, wherein, at the step of storing the object identifier and the signature on the data storage device, the object identifier and the signature are encoded in the one or more machine-readable data storage media.

16. The computer-implemented method of claim 15, further comprising steps of a verifier:

for the physical object, reading the one or more machine-readable data storage media to obtain the object identifier and the signature encoded therein;

obtaining the digital fingerprint from the unique property of the physical object, wherein the digital fingerprint is impacted by the unique property; and verifying that the signature matches the object identifier and the digital fingerprint.

17. The computer-implemented method of claim 16, further comprising the step of the verifier:

ascertaining a public key obtained from a digital certificate issued for the public key.

18. The computer-implemented method of claim 1, wherein the second dataset comprises a subset of the digital fingerprint.

19. The computer-implemented method of claim 1, wherein the second dataset comprises permuted subsets of the object identifier and the digital fingerprint.

20. A computer system for managing physical objects, the computer system comprising:

one or more processors, one or more computer readable tangible storage devices, and program instructions stored on at least one of the one or more computer readable tangible storage devices for execution by at least one of the one or more processors, the program instructions executable to:

associate a physical object of a set of physical objects with an object identifier;

obtain a digital fingerprint of the physical object, wherein the digital fingerprint is a first dataset that is obtained from at least one of a physical property, a chemical property, and a biological property of the physical object;

obtain, from the object identifier and the digital fingerprint, a second dataset that captures information of a pair of the object identifier and the digital fingerprint;

cryptographically sign the pair of the object identifier and the digital fingerprint; and store the object identifier and signature of the pair of the object identifier and the digital fingerprint on a data storage device.

21. The computer system of claim 20, wherein the computer system further comprises a computerized data storage system as the data storage device, wherein the computer system further comprises the program instructions executable to store the object identifier and the signature on the computerized data storage system.

22. The computer system of claim 21, wherein commissioning the physical object is carried out by a computerized system that is distinct from the computerized data storage system but in data communication therewith.

23. A computer program product for managing physical objects, the computer program product comprising one or more computer-readable tangible storage devices and program instructions stored on at least one of the one or more computer-readable tangible storage devices, the program instructions executable to:

associate a physical object of a set of physical objects with an object identifier;

obtain a digital fingerprint of the physical object, wherein the digital fingerprint is a first dataset that is obtained from at least one of a physical property, a chemical property, and a biological property of the physical object;

obtain, from the object identifier and the digital fingerprint, a second dataset that captures information of a pair of the object identifier and the digital fingerprint;

cryptographically sign the pair of the object identifier and the digital fingerprint; and store the object identifier and signature of the pair of the object identifier and the digital fingerprint on a data storage device.

24. The computer program product of claim 23, further comprising the program instructions executable to:

store the object identifier and the signature on a computerized data storage system.

25. The computer program product of claim 24, further comprising the program instructions executable to:

store at least one of a digital certificate and an encrypted version of the digital fingerprint on the computerized data storage system, along with the signature and the object identifier.

* * * * *